(12) United States Patent
Nwosu

(10) Patent No.: US 10,946,959 B2
(45) Date of Patent: Mar. 16, 2021

(54) DRONE CONFIGURED FOR MULTIPLE USES

(71) Applicant: Arizechukwu Nwosu, Westlake Village, CA (US)

(72) Inventor: Arizechukwu Nwosu, Westlake Village, CA (US)

( * ) Notice: Subject to any disclaimer, the term of this patent is extended or adjusted under 35 U.S.C. 154(b) by 381 days.

(21) Appl. No.: 16/155,210

(22) Filed: Oct. 9, 2018

(65) Prior Publication Data
US 2020/0108928 A1    Apr. 9, 2020

(51) Int. Cl.
*B64C 39/02*    (2006.01)
*B64D 27/24*    (2006.01)
*B64D 27/02*    (2006.01)

(52) U.S. Cl.
CPC ............ *B64C 39/024* (2013.01); *B64D 27/24* (2013.01); *B64C 2201/027* (2013.01); *B64D 2027/026* (2013.01)

(58) Field of Classification Search
CPC ........ B64C 39/024; B64C 17/08; B64C 25/10
See application file for complete search history.

(56) References Cited

U.S. PATENT DOCUMENTS

| 866,369 | A | * | 9/1907 | Learnard | ................... | B63H 1/24 |
| | | | | | | 416/142 |
| D745,435 | S | * | 12/2015 | Park | ............................ | D12/16.1 |
| D774,941 | S | * | 12/2016 | Lupashin | .............. | B64C 39/024 |
| | | | | | | D12/16.1 |
| 9,527,588 | B1 | * | 12/2016 | Rollefstad | ............ | G05D 1/0005 |
| 9,573,683 | B2 | * | 2/2017 | Martin | ................... | B64C 39/024 |
| 9,914,537 | B2 | * | 3/2018 | Wu | ............................ | B64C 1/30 |
| D834,996 | S | * | 12/2018 | Zheng | ..................... | F42B 15/08 |
| | | | | | | D12/16.1 |
| 10,647,404 | B2 | * | 5/2020 | Sugaki | ..................... | B64D 9/00 |
| 10,793,270 | B2 | * | 10/2020 | Chen | ..................... | B64C 39/024 |
| 2013/0206915 | A1 | * | 8/2013 | Desaulniers | .......... | B64C 39/028 |
| | | | | | | 244/165 |
| 2014/0339355 | A1 | * | 11/2014 | Olm | ...................... | B64C 39/024 |
| | | | | | | 244/17.23 |
| 2015/0259066 | A1 | * | 9/2015 | Johannesson | ............. | B64C 1/30 |
| | | | | | | 244/17.27 |
| 2016/0001879 | A1 | * | 1/2016 | Johannesson | ........... | B64C 27/50 |
| | | | | | | 416/142 |
| 2016/0176520 | A1 | * | 6/2016 | Goldstein | ............. | B64C 39/024 |
| | | | | | | 244/17.17 |
| 2016/0272310 | A1 | * | 9/2016 | Chan | ....................... | B64D 1/00 |

(Continued)

*Primary Examiner* — Michael H Wang
(74) *Attorney, Agent, or Firm* — Dhiraj Jindal; Patent Yogi LLC

(57) ABSTRACT

Disclosed is a drone configured for multiple uses. The drone may include a body and a sensor configured to be attached to the body. Further, the drone may include a plurality of arms configured to be attached to the body. Further, a first end of an arm of the plurality of arms may be attached to the body at a first movable joint. Further, the arm may include a first part connected to the first movable joint. Further, the arm may include a second part attached to the first part at a second movable joint. Further, the arm may include a powered rotor including a shaft configured to provide rotatory motion. Further, the powered rotor may be attached to one or more of the first part and the second part. Further, the drone may include a plurality of propeller blades attached to the shaft.

20 Claims, 8 Drawing Sheets

(56) References Cited

U.S. PATENT DOCUMENTS

| | | | |
|---|---|---|---|
| 2017/0036771 A1* | 2/2017 | Woodman | B64C 25/54 |
| 2017/0166308 A1* | 6/2017 | Desrochers | B64C 39/024 |
| 2017/0247098 A1* | 8/2017 | Sanlaville | B64C 1/30 |
| 2018/0105254 A1* | 4/2018 | Tian | B64C 27/08 |
| 2018/0201356 A1* | 7/2018 | Cai | B64C 39/024 |
| 2018/0281933 A1* | 10/2018 | Davis | B64C 25/12 |
| 2018/0304984 A1* | 10/2018 | Zheng | B64C 1/30 |
| 2018/0327092 A1* | 11/2018 | Deng | B64C 39/024 |
| 2019/0077503 A1* | 3/2019 | Reddy | F42B 15/08 |
| 2020/0317318 A1* | 10/2020 | Wu | B64C 1/30 |

* cited by examiner

DRONE CONFIGURED FOR MULTIPLE USES

FIELD OF THE INVENTION

The present disclosure relates to the field of aircraft and in particular the field of autonomous and automatic aircraft such as drones. More specifically, the present disclosure describes a drone configured for multiple uses.

BACKGROUND OF THE INVENTION

Individuals, small businesses, and large corporations are making use of unmanned drones for various purposes. Further, with advancement in flight technologies, drones are becoming increasingly affordable, capable of performing a wide variety of tasks, and aid in multiple operations.

However, most modern drones include limited capabilities and can only capture images, and record footage while airborne. Such a limited capability makes drones more or less impractical while the drones are not in flight.

Further, drones mostly have unconventional shapes, and irregularly shaped bodies. Therefore, drones occupy a lot of space, and for the most part are not easy to transport without special carrying cases or mechanisms.

Furthermore, individuals who may own drones may need to purchase additional equipment such as tripods and camera/selfie sticks if the individuals wish to practice photography on the ground. Accordingly, carrying all additional photography equipment, in addition to a drone may be an extra hassle for individuals who may be drone owners.

Yet further, most drones usually incorporate a fixed landing gear that may only serve a singular purpose of a landing gear, and may not serve additional purposes, such as propeller protection.

Therefore, there is a need for an improved drone configured for multiple uses that may overcome one or more of the abovementioned problems and/or limitations.

SUMMARY

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to some embodiments, a drone configured for multiple uses is disclosed. The drone may include a body a sensor configured to be attached to the body. Further, the drone may include a plurality of arms configured to be attached to the body. Further, a first end of an arm of the plurality of arms may be attached to the body at a first movable joint. Further, the first movable joint may be configured to allow the arm to move between an extended arm state and a collapsed arm state. Further, the arm may include a first part connected to the first movable joint. Further, the arm may include a second part attached to the first part at a second movable joint. Further, the second part may be movable between an open state and a closed state. Further, the first part and the second part cooperate to form an enclosure in the closed state. Further, each second part corresponding to the plurality of arms being in the closed state facilitates the drone to stand on a horizontal surface. Further, the arm may include a powered rotor including a shaft configured to provide rotatory motion. Further, the powered rotor may be attached to one or more of the first part and the second part. Further, the arm may include a plurality of propeller blades attached to the shaft. Further, a propeller blade of the plurality of propeller blades may be attached to the shaft at a third movable joint. Further, the propeller blade may be movable between an extended blade state and a collapsed blade state. Further, each of the powered rotor and the plurality of propeller blades may be disposed within the enclosure in the closed state.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
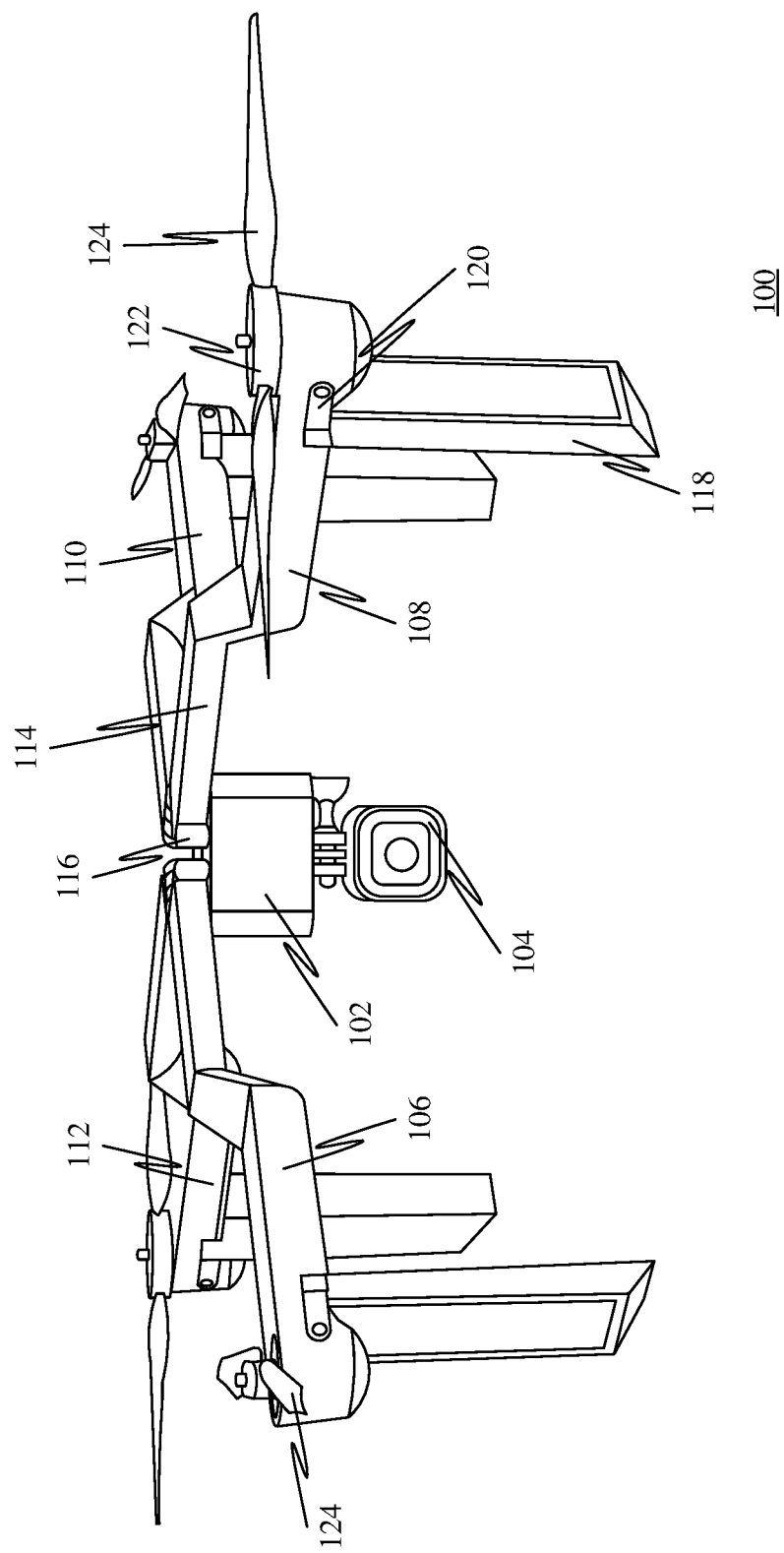
FIG. 1 illustrates a side view of a drone configured for multiple uses, in accordance with a first embodiment.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a drone configured for multiple uses, embodiments of the present disclosure are not limited to use only in this context.

Overview

In accordance with some embodiments, the drone capable of being transformed into a tripod based stationary camera may be called as Falcon, and may be a multi-purpose and multi-use drone. The drone may be useful in the air as well on the ground as the drone may be transformable from an unmanned drone to a tripod or a camera/selfie stick.

Further, the drone may offer flexibility, ease of use in the air as well as on land, and provide an ideal solution for use over the multiple configurations, such as a drone, and as a tripod.

Further, the drone may incorporate a movable landing gear that may serve multiple purposes. For instance, in addition to functioning as landing gear, the landing gear may function as a propeller guard when in flight, a propeller scoop or gathering mechanism and as a propeller guard when the drone may be configured as a selfie/camera stick, as a tripod, and during storage.

Figure 5:
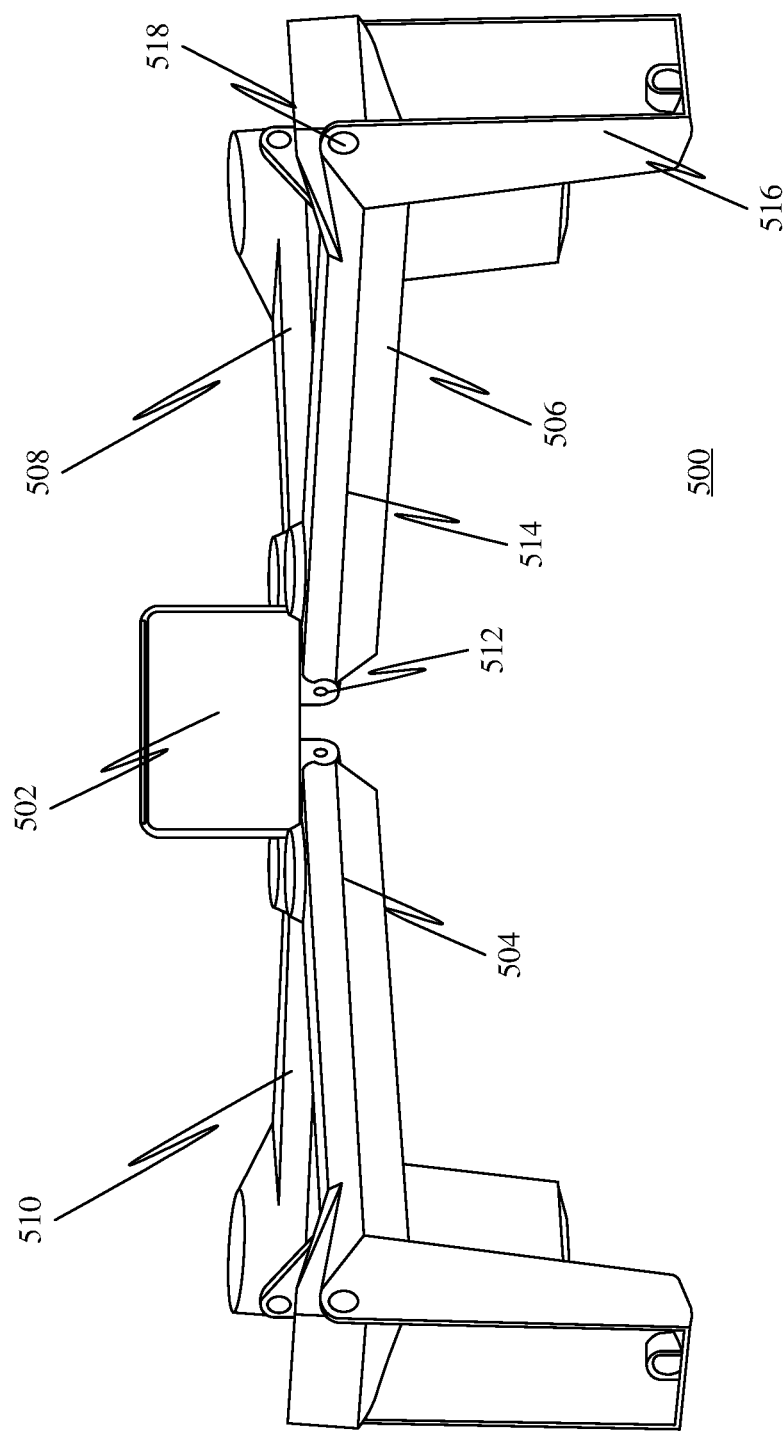
FIG. 5 illustrates a side view of a drone configured for multiple uses, in accordance with a second embodiment.
Figure 6:
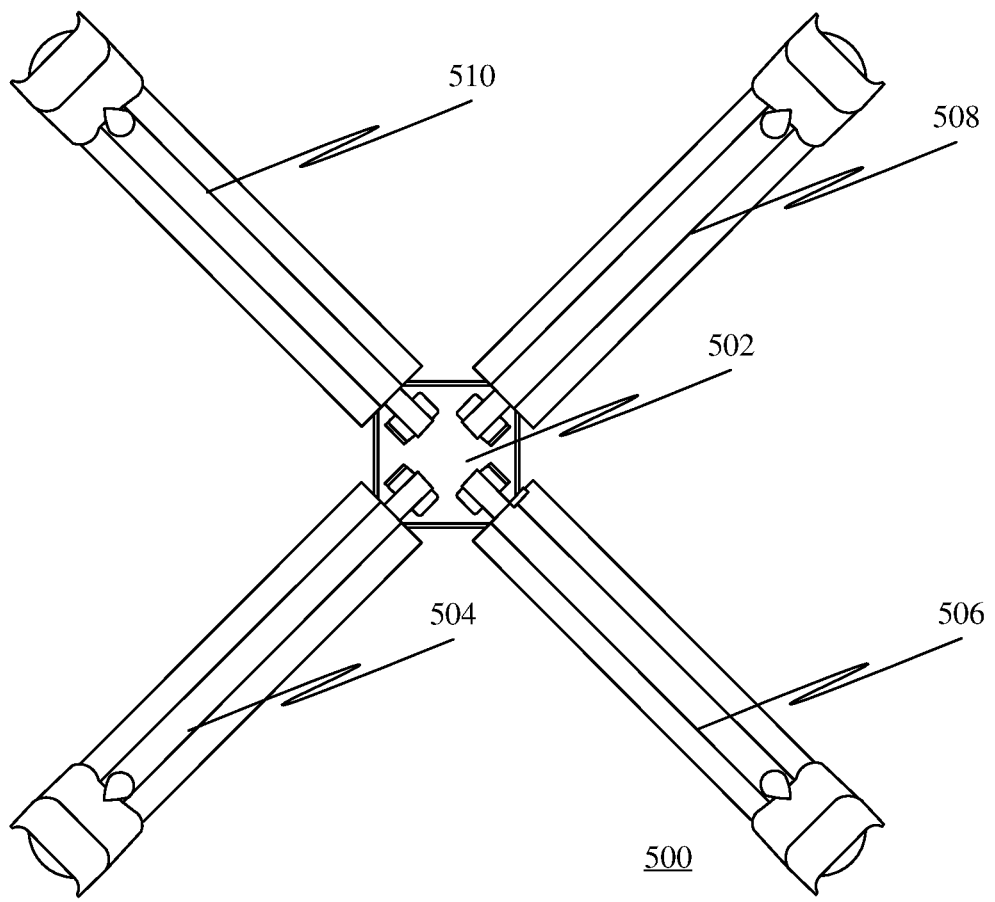
FIG. 6 illustrates a bottom view of the drone configured for multiple uses, in accordance with the second embodiment.

Further, two different embodiments of the drone are illustrated in the drawings. More specifically, FIGS. 1-4 show a first embodiment of the drone, and FIGS. 5 and 6 show a second embodiment of the drone. The first and the second embodiments are illustrated and described to include one or more different components and configurations of the drone, which may provide one or more different features. However, the first and second embodiments may not be considered mutually exclusive with respect to the components, configurations, and features included in the first and second embodiments. Accordingly, one or more of features included in an embodiment may also be included in the other. For instance, components, configurations, and features illustrated and described with respect to the first embodiment may also be included in the second embodiment, and vice-versa.

First Embodiment

FIG. 1 illustrates a side view of a drone 100 configured for multiple uses. The drone 100 may include a body 102, a sensor configured to be attached to the body 102, such as a camera 104, and a plurality of arms 106, 108, 110, and 112 configured to be attached to the body 102. In some embodiments, as shown in the FIG. 1, the plurality of arms may include four arms. Further, in some embodiments, the plurality of arms may include any number of arms, such as three arms, or six arms. Further, the camera 104 attached to the body 102 may include a high-speed camera, a thermographic camera, thermal imaging camera, and so on.

Further, a first end of the arm 108 of the plurality of arms 106, 108, 110, and 112 may be attached to the body 102 at a first movable joint 116. Further, the first movable joint 116 may be configured to allow the arm 108 to move between an extended arm state and a collapsed arm state. The collapsed arm state is explained in greater detail in conjunction with FIGS. 2 and 3.

Further, the arm 108 may include a first part 114 connected to the first movable joint 116. Further, the arm may include a second part 118 attached to the first part 114 at a second movable joint 120. Further, the second part 118 may be movable between an open state and a closed state (as illustrated in the FIG. 1). Further, the first part 114 and the second part 118 may cooperate to form an enclosure in the closed state. Further, each second part, such as the second part 118 of the arm 108, corresponding to the plurality of arms 106, 108, 110, and 112 being in the closed state may facilitate the drone 100 to stand on a horizontal surface. Further, the each of the plurality of arms 106, 108, 110, and 112 may include a powered rotor including a shaft, such as the powered rotor 122 attached to the arm 108, configured to provide rotary motion. Further, the powered rotor 122 may be attached to one or more of the first part 114 and the second part 118 of the arm 108. Further, the drone 100 may include a plurality of propeller blades, such as the propeller blades 124 connected to the powered rotor 122, attached to the shaft. Further, propeller blades 124 of the plurality of propeller blades may be attached to the shaft at a third movable joint. Further, the propeller blades 124 may be movable between an extended blade state and a collapsed blade state. Further, the powered rotor 122, and the propeller blades 124 may be disposed within the enclosure between the first part 114, and the second part 118 in the closed state. The disposition of the plurality of propeller blades in the enclosure is described in detail in relation with FIG. 4.

In some embodiments, each of the plurality of arms being in the extended arm state may facilitate the drone to fly. Further, in some embodiments, each of the plurality of arms may lie in a common plane in the extended arm state.

In some embodiments, the third movable joint may include a spring configured to maintain the plurality of propeller blades 124 in the extended blade state. Further, the second part 118 may be in the open state.

In some embodiments, the open state corresponding to the second part 118 may include a first open state. Further, in the first open state, a longitudinal axis of the second part 118 may be substantially parallel to a plane of rotation corresponding to the plurality of propeller blades.

In some embodiments, the open state corresponding to the second 118 part may include a second open state. Further, in the second open state, a longitudinal axis of the second part may be substantially perpendicular to a plane of rotation corresponding to the plurality of propeller blades. Accordingly, each second part, such as the second part 118 of the arm 108, corresponding to the plurality of arms 106, 108, 110, and 112 may act as a landing gear for the drone 100 when in the second open state, and may allow the drone 100 to land on the horizontal surface.

In some embodiments, the first part 114 of the arm 108 may include a first anterior end and a first posterior end. Further, the first anterior end may be proximal to the first movable joint 116. Further, the first posterior end may be proximal to the second movable joint 120. Further, the second part 118 may include a second anterior end and a second posterior end. Further, the second anterior end may be proximal to the second movable joint 120. Further, the arm 108 further may include at least one anti-slip component disposed on one or more of the first posterior end and the second anterior end. Further, the at least one anti-slip component may be configured to provide traction against the horizontal surface.

Further, in some embodiments, one or more of the first part 114 and the second part 118 of each of the plurality of arms may include a plurality of telescopic sections movably coupled together. Further, the plurality of telescopic sections may be configured to be movable between a lengthened state and a shortened state.

In some embodiments, the drone 100 may further include one or more first actuators operatively coupled to the body 102, and the plurality of arms 106, 108, 110, and 112. Further, the first actuators may be configured to move the plurality of arms 106, 108, 110, and 112 between the extended arm state and the collapsed arm state. Further, the drone 100 may include one or more second actuators operatively coupled to the plurality of first parts and the second parts corresponding to the plurality of arms 106, 108, 110, and 112, such as the first part 114 and the second part 118. Further, the second actuators may be configured to move the plurality of second parts between the open state and the closed state. Further, the drone may include a processor communicatively coupled to each of the first actuators and the second actuators. Further, the processor may be configured to control operation of the first actuators and the second actuators, such as moving one or more of the plurality of arms to the extended state, or the collapsed state, or mobbing the second parts from the open state to the closed state.

In some embodiments, the drone 100 may further include a wireless receiver communicatively coupled to the processor. Further, the wireless receiver may be configured to receive a control command configured to control operation of one or more of the first actuator and the second actuator.

Figure 2:
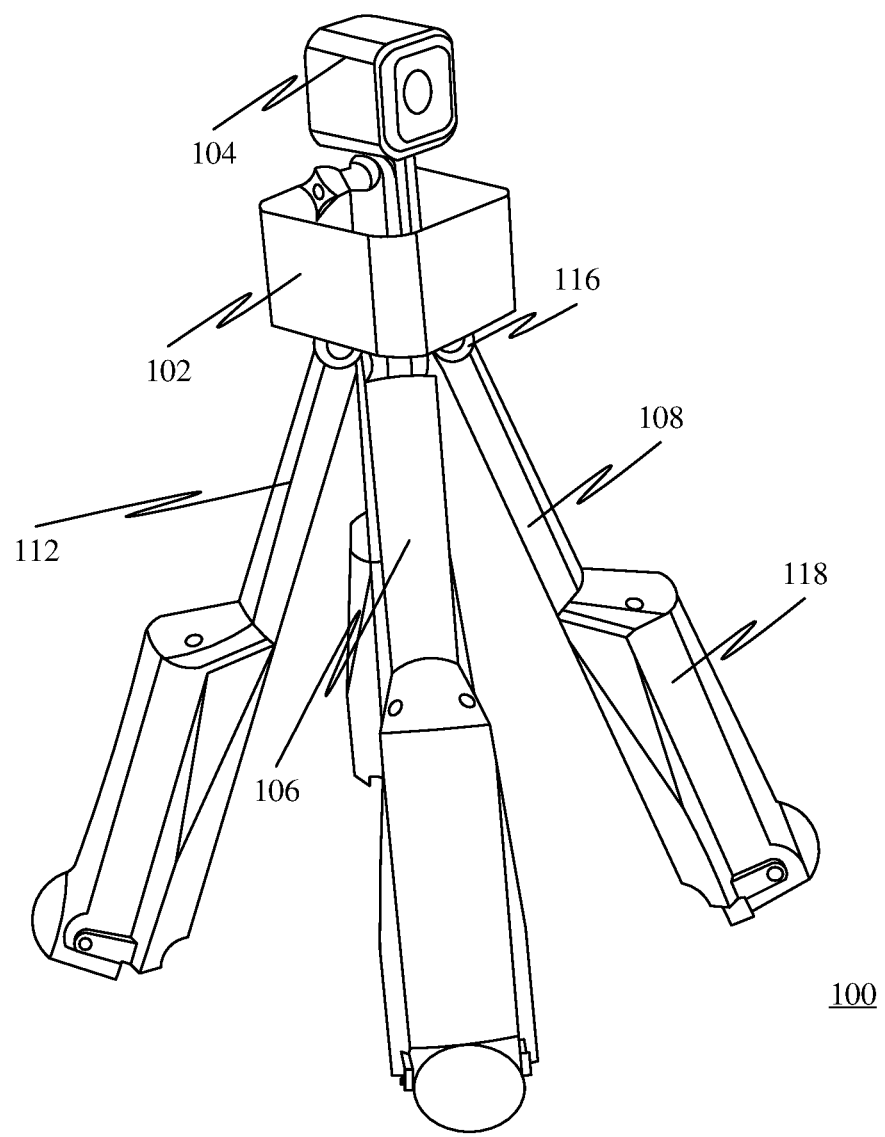
FIG. 2 shows the drone in a first collapsed arm state, in accordance with the first embodiment.

FIG. 2 shows the drone 100 in a first collapsed arm state. The first movable joint 116 may be configured to allow the arm 108 to move to the first collapsed arm state from the extended arm state. Further, the first collapsed arm state may include the second part 118 to be in the closed state. Further, each of the plurality of arms, including the arms 106, 108, and 112 being in the first collapsed arm state may facilitate the drone 100 to stand on a horizontal surface, such as in a tripod configuration. Further, the drone 100, while standing on the horizontal surface in the first collapsed arm state may facilitate ease of use of the camera 104, connected to the body 102, while the drone 104 is not airborne. Further, each arm may form an acute angle with the horizontal surface in the first collapsed state to facilitate stability while the drone is standing on the horizontal surface.

Figure 3:
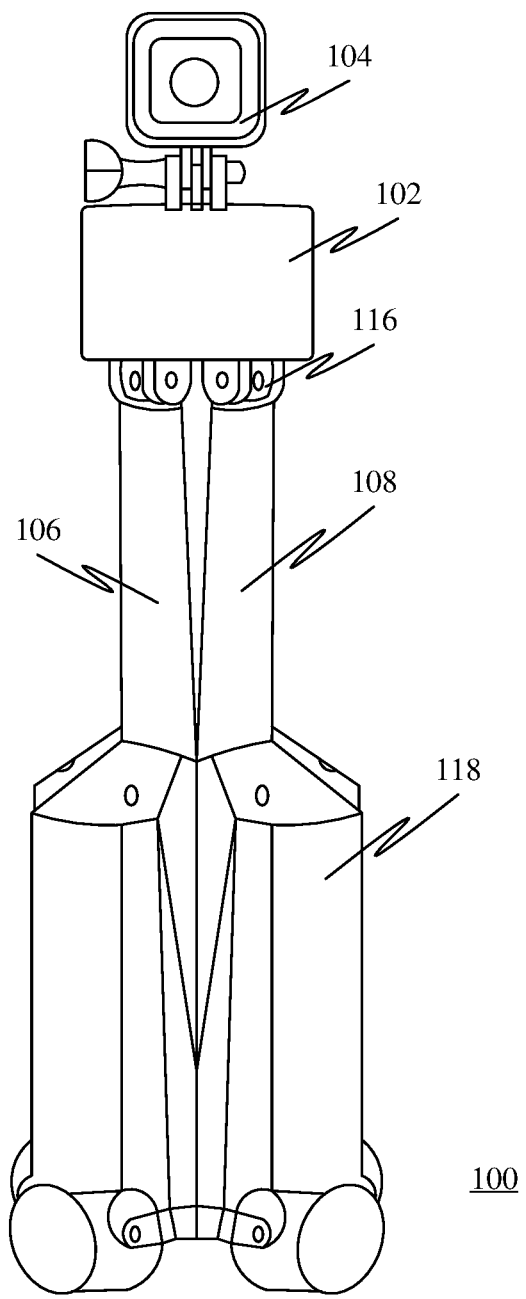
FIG. 3 shows the drone in a second collapsed arm state, in accordance with the first embodiment.

FIG. 3 shows the drone 100 in a second collapsed arm state. The first movable joint 116 may be configured to allow the arm 108 to move to the second collapsed arm state from the extended arm state, and the first collapsed arm state. Further, the second collapsed arm state may include the second part 118 to be in the closed state. Further, each of the plurality of arms being in the first collapsed arm state may facilitate the plurality of arms, including the arms 106, and 108, and therefore the drone 100 to be grasped by a human hand.

Accordingly, the drone 100, in the second collapsed arm state may facilitate ease of use of the camera 104, connected to the body 102, while the drone 104 is grasped by the human hand, such as a selfie stick. In some embodiments, a cross-sectional area corresponding to at least a portion of the plurality of arms in the second collapsed state may be less than 70 mm so as to facilitate a better grip by the human hand. In some embodiments, the portion of the plurality of arms in the second collapsed state may include the first part of the plurality of arms. In some embodiments, at least a portion of the plurality of arms may include an anti-slip grip configured to facilitate gripping of the plurality of arms by the human hand.

Figure 4:
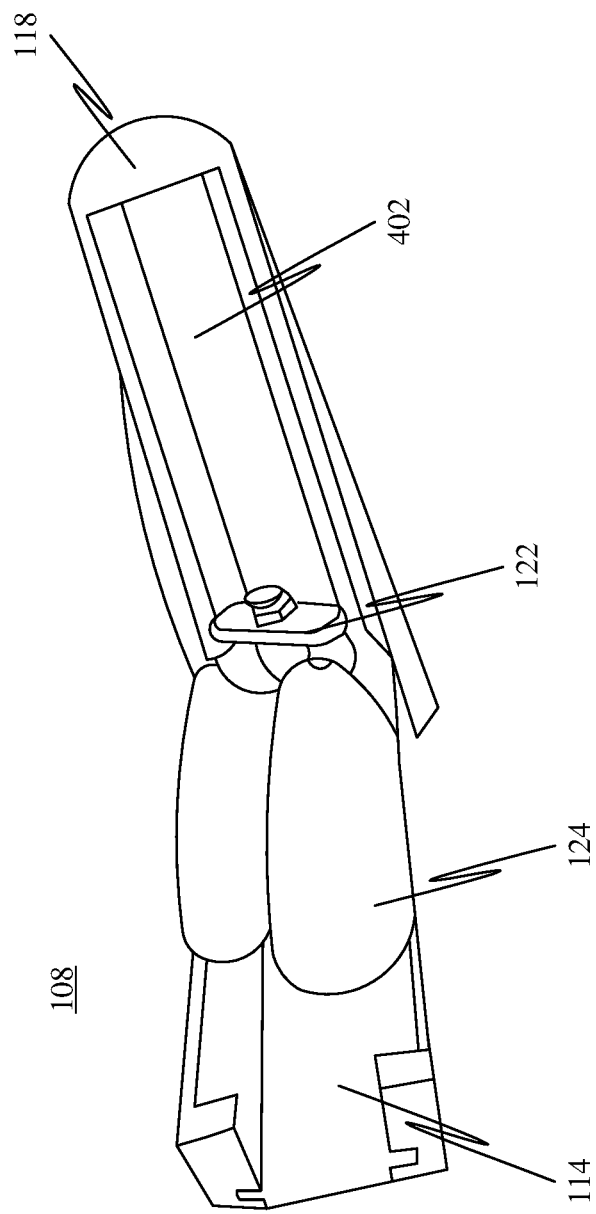
FIG. 4 shows a detached view of the arm of the drone, in accordance with the first embodiment.

FIG. 4 shows a detached view of the arm 108 of the drone 100. The powered rotor 122 may be attached to the first part 114 of the arm 108. Further, the second part 118 of the arm 108 may include a cavity 402 configured to enclose each of the powered rotor 122 and the propeller blades 124 in the closed state, wherein, the propeller blades 124 may be in the closed blade state while enclosed in the cavity 402. Accordingly, the enclosure may be formed by the cavity 402 of the second part 118, and the first part 114. In some embodiments, movement of the second part 118 from the open state to the closed state may cause the propeller blades 124 to move from the extended blade state to the collapsed blade state.

Second Embodiment

FIG. 5 illustrates a side view of a drone 500 configured for multiple uses. The drone 500 may include a body 502, a sensor (not shown) configured to be attached to the body 502, and a plurality of arms 504, 506, 508, and 510 configured to be attached to the body 502. In some embodiments, as shown in the FIG. 5, the plurality of arms may include four arms. Further, in some embodiments, the plurality of arms may include any number of arms, such as three arms, or six arms. Further, the sensor attached to the body 502 may include a camera, such as a high-speed camera, a thermographic camera, thermal imaging camera, and so on.

Further, a first end of the arm 506 of the plurality of arms 504, 506, 508, and 510 may be attached to the body 502 at a first movable joint 512. Further, the first movable joint 512 may be configured to allow the arm 506 to move between an extended arm state and a collapsed arm state.

Further, the arm 506 may include a first part 514 connected to the first movable joint 512. Further, the arm may include a second part 516 attached to the first part 514 at a second movable joint 518. Accordingly, as shown in FIG. 5, the first part 514 of the arm 506 may begin from the first movable joint 512, and end at the second movable joint 518. The remaining part of the arm 506 beginning from the second movable joint 518 may be defined as the second part 516.

Further, the second part 516 may be movable between an open state and a closed state (as illustrated in the FIG. 1). Further, the first part 514 and the second part 516 may cooperate to form an enclosure in the closed state. Further, each second part, such as the second part 516 of the arm 506, corresponding to the plurality of arms 504, 506, 508, and 510 being in the closed state may facilitate the drone 500 to stand on a horizontal surface. Further, the each of the plurality of arms 504, 506, 508, and 510 may include a powered rotor including a shaft (not shown) attached to the arm 506, configured to provide rotatory motion. Further, the powered rotor may be attached to one or more of the first part 514 and the second part 516 of the arm 506. Further, the drone 500 may include a plurality of propeller blades (not shown), attached to the shaft. Further, a propeller blade of the plurality of propeller blades may be attached to the shaft at a third movable joint. Further, the propeller blade may be movable between an extended blade state and a collapsed blade state. Further, each of the powered rotor and the plurality of propeller blades may be disposed within the enclosure in the closed state.

In some embodiments, each of the plurality of arms being in the extended arm state may facilitate the drone to fly. Further, in some embodiments, each of the plurality of arms may lie in a common plane in the extended arm state.

In some embodiments, the third movable joint may include a spring configured to maintain the plurality of propeller blades in the extended blade state. Further, the second part 516 may be in the open state.

In some embodiments, the open state corresponding to the second part 516 may include a first open state. Further, in the first open state, a longitudinal axis of the second part may be substantially parallel to a plane of rotation corresponding to the plurality of propeller blades.

In some embodiments, the open state corresponding to the second part 516 may include a second open state. Further, in the second open state, a longitudinal axis of the second part may be substantially perpendicular to a plane of rotation corresponding to the plurality of propeller blades. Accordingly, each second part, such as the second part 516 of the arm 506, corresponding to the plurality of arms 504, 506, 508, and 510 may act as a landing gear for the drone 500 when in the second open state, and may allow the drone 500 to land on the horizontal surface.

In some embodiments, the first part 514 of the arm 506 may include a first anterior end and a first posterior end. Further, the first anterior end may be proximal to the first movable joint 512. Further, the first posterior end may be proximal to the second movable joint 518. Further, the second part 516 may include a second anterior end and a second posterior end. Further, the second anterior end may be proximal to the second movable joint 518. Further, the arm 506 further may include at least one anti-slip component disposed on one or more of the first posterior end and the second anterior end. Further, the at least one anti-slip component may be configured to provide traction against the horizontal surface.

Further, in some embodiments, one or more of the first part 514 and the second part 516 of each of the plurality of arms may include a plurality of telescopic sections movably coupled together. Further, the plurality of telescopic sections may be configured to be movable between a lengthened state and a shortened state.

In some embodiments, the drone 500 may further include a first actuator operatively coupled to the body 502, and the plurality of arms 504, 506, 508, and 510. Further, the first actuator may be configured to move the plurality of arms 504, 506, 508, and 510 between the extended arm state and the collapsed arm state. Further, the drone 500 may include a second actuator operatively coupled to the plurality of first parts and the second parts corresponding to the plurality of arms 504, 506, 508, and 510, such as the first part 514 and the second part 516. Further, the second actuator may be configured to move the plurality of second parts between the open state and the closed state. Further, the drone may include a processor communicatively coupled to each of the first actuator and the second actuator. Further, the processor may be configured to control operation of the first actuator and the second actuator.

In some embodiments, the drone 500 may further include a wireless receiver communicatively coupled to the processor. Further, the wireless receiver may be configured to receive a control command configured to control operation of one or more of the first actuator and the second actuator.

FIG. 6 illustrates a bottom view of the drone 500 configured for multiple uses. The drone 500 includes the one or more components, such as a body 502, configured to be attached to the body 502, and a plurality of arms 504, 506, 508, and 510 configured to be attached to the body 502, and other components, as explained in conjunction with FIG. 5

Figure 7:
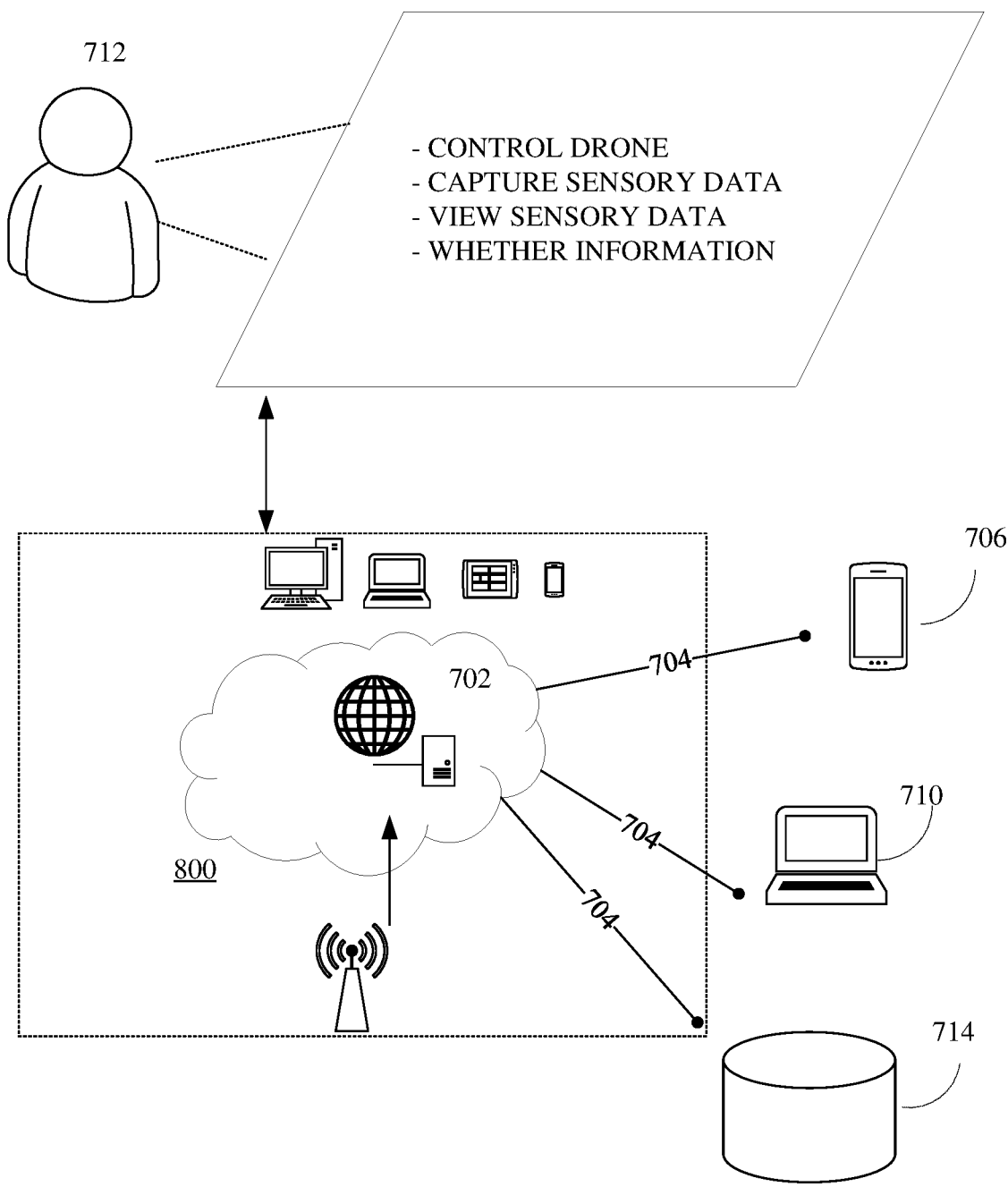
FIG. 7 is an illustration of a platform consistent with various embodiments of the present disclosure

FIG. 7 is an illustration of a platform consistent with various embodiments of the present disclosure. By way of non-limiting example, the online platform 700 for facilitation operation of a drone configured for multiple users may be hosted on a centralized server 702, such as, for example, a cloud computing service. The centralized server 702 may communicate with other network entities, such as, for example, a mobile device 706 (such as a smartphone, a laptop, a tablet computer etc.), other electronic devices 710 (such as drones), databases 714 (e.g. other online platforms providing relevant data, such as weather databases), over a communication network 704, such as, but not limited to, the Internet. Further, users of the platform may include relevant parties such as one or more of drone owners, drone photographers, etc. Accordingly, electronic devices operated by the one or more relevant parties may be in communication with the platform. For example, A user 712, such as the one or more relevant parties, may access platform 700 through a web-based software application or browser. The web-based software application may be embodied as, for example, but not be limited to, a website, a web application, a desktop application, and a mobile application compatible with a computing device 800.

According to some embodiments, the online platform 700 may be configured to communicate with a drone configured for multiple uses, such as the drone 100, and facilitate the operation of the drone.

Accordingly, the online platform 700 may communicate with one or more user devices, such as the network device 706, including one or more of smartphones, laptop computers, tablet computers, wearable devices, such as smartwatches, and so on, and allow a user to operate the drone.

Further, the online platform 700 may communicate with one or more external databases, such as weather databases, and may provide data that may be used to facilitate the operation of the drone, such weather conditions in a region or location where a user may wish to operate the drone. Further, in an instance, the online platform 700 may communicate with one or more external databases, such as databases containing flight regulations particular to a region where the user may wish to operate the drone, and may transmit the one or more flight regulations to a user device of the user, such as the user device used by the user to operate the drone, for e.g. a smartphone.

Further, the online platform 700 may allow storage of sensory data, captured through one or more sensors connected to the drone.

Figure 8:
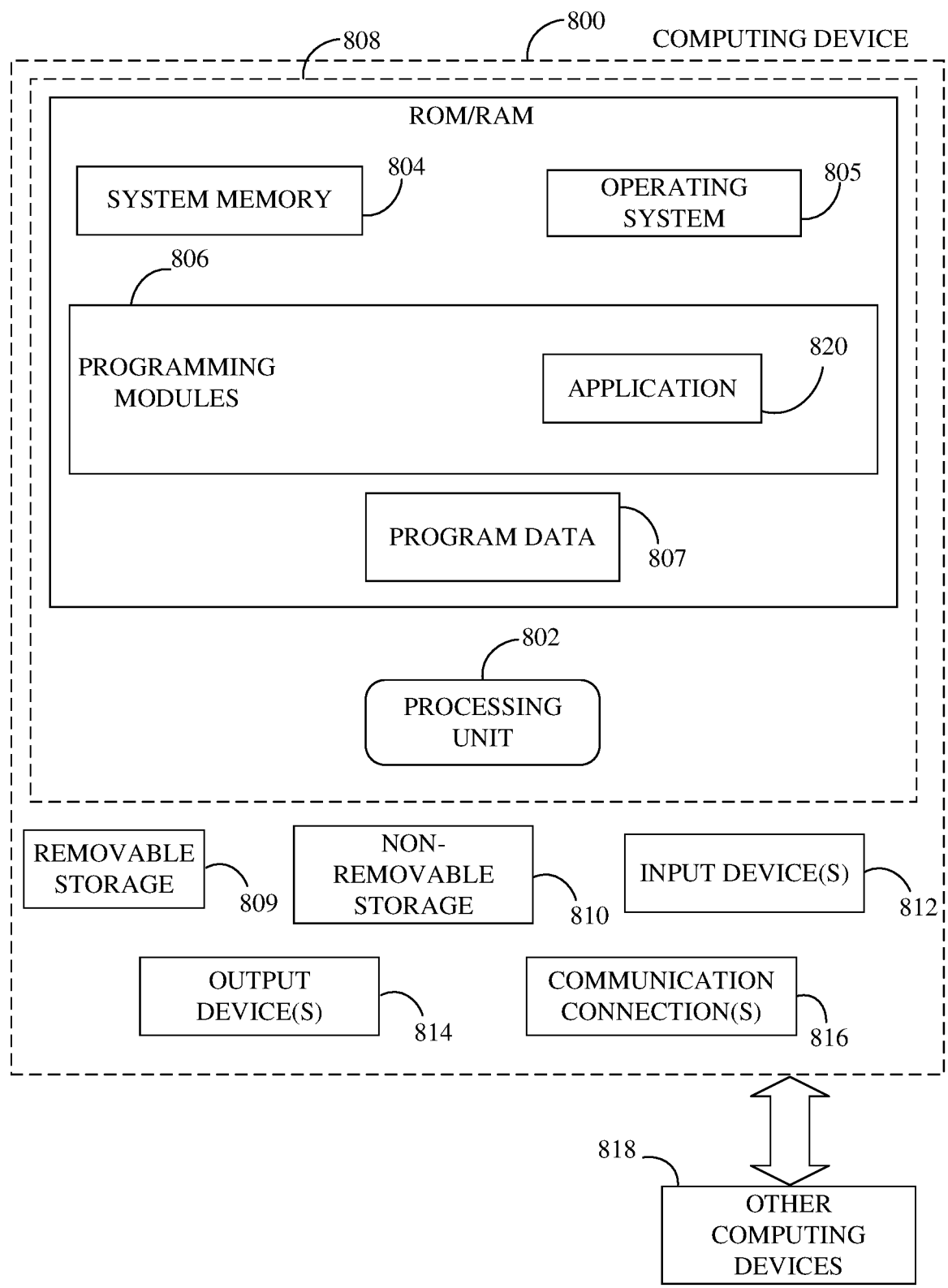
FIG. 8 is a block diagram of a computing device for implementing the methods disclosed herein, in accordance with some embodiments

FIG. 8 is a block diagram of a computing device for implementing the methods disclosed herein, in accordance with some embodiments. Consistent with an embodiment of the disclosure, the aforementioned storage device and processing device may be implemented in a computing device, such as computing device 800 of FIG. 8. Any suitable combination of hardware, software, or firmware may be used to implement the memory storage and processing unit. For example, the storage device and the processing device may be implemented with computing device 800 or any of other computing devices 818, in combination with computing device 800. The aforementioned system, device, and processors are examples and other systems, devices, and processors may comprise the aforementioned storage device and processing device, consistent with embodiments of the disclosure.

With reference to FIG. 8, a system consistent with an embodiment of the disclosure may include a computing device or cloud service, such as computing device 800. In a basic configuration, computing device 800 may include at least one processing unit 802 and a system memory 804. Depending on the configuration and type of computing device, system memory 804 may comprise, but is not limited to, volatile (e.g. random access memory (RAM)), non-volatile (e.g. read-only memory (ROM)), flash memory, or any combination. System memory 804 may include operating system 805, one or more programming modules 806, and may include a program data 807. Operating system 805, for example, may be suitable for controlling computing device 800's operation. Furthermore, embodiments of the disclosure may be practiced in conjunction with a graphics library, other operating systems, or any other application program and is not limited to any particular application or system. This basic configuration is illustrated in FIG. 8 by those components within a dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and nonvolatile, removable and non-removable media implemented in any method or technology for storage of information, such as computer-readable instructions, data structures, program modules, or other data. System memory 804, removable storage 809, and non-removable storage 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a touch input device, etc. Output device(s) 814 such as a display, speakers, a printer, etc. may also be included. The aforementioned devices are examples and others may be used.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 804, including operating system 805. While executing on processing unit 802, programming modules 806 (e.g., application 820) may perform processes, algorithms, systems, applications, servers, databases as described above. The aforementioned process is an example, and processing unit 802 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

What is claimed is:

1. A drone configured for multiple uses, the drone comprising:
   a body;
   a sensor configured to be attached to the body; and
   a plurality of arms configured to be attached to the body, wherein a first end of an arm of the plurality of arms is attached to the body at a first movable joint, wherein the first movable joint is configured to allow the arm to move between an extended arm state and a collapsed arm state, wherein the arm comprises:
      a first part connected to the first movable joint;
      a second part attached to the first part at a second movable joint, wherein the second part is movable between an open state and a closed state, wherein the first part and the second part cooperate to form an enclosure in the closed state, wherein each second part corresponding to the plurality of arms being in the closed state facilitates the drone to stand on a horizontal surface;
      a powered rotor comprising a shaft configured to provide rotatory motion, wherein the powered rotor is attached to at least one of the first part and the second part; and
      a plurality of propeller blades attached to the shaft, wherein a propeller blade of the plurality of propeller blades is attached to the shaft at a third movable joint, wherein the propeller blade is movable between an extended blade state and a collapsed blade state, wherein each of the powered rotor and the plurality of propeller blades are disposed within the enclosure in the closed state.

2. The drone of claim 1, wherein the collapsed arm state comprises a first collapsed arm state and a second collapsed state, wherein the first movable joint is configured to allow the arm to move between the first collapsed arm state and the second collapsed arm state, wherein each of the plurality of arms being in the first collapsed arm state facilitates the drone to stand on a horizontal surface, wherein each of the plurality of arms being in the second collapsed arm state facilitates the plurality of arms to be grasped by a human hand.

3. The drone of claim 2, wherein a cross-sectional area corresponding to at least a portion of the plurality of arms in the second collapsed state is less than 70 mm.

4. The drone of claim 3, wherein the portion comprises the first part.

5. The drone of claim 3, wherein each of the plurality of arms lies in a common plane in the extended arm state.

6. The drone of claim 2, wherein the plurality of arms comprises four arms, wherein each arm forms an acute angle with the horizontal surface in the first collapsed state.

7. The drone of claim 1, wherein each of the plurality of arms being in the extended arm state facilitates the drone to fly.

8. The drone of claim 1, wherein the first part comprises a first anterior end and a first posterior end, wherein the first anterior end is proximal to the first movable joint, wherein the first posterior end is proximal to the second movable joint, wherein the second part comprises a second anterior end and a second posterior end, wherein the second anterior end is proximal to the second movable joint, wherein the arm further comprises at least one anti-slip component disposed on at least one of the first posterior end and the second anterior end, wherein the at least one anti-slip component is configured to provide traction against the horizontal surface.

9. The drone of claim 1, wherein the powered rotor is attached to the first part, wherein the second part comprises a cavity configured to enclose each of the powered rotor and the plurality of propeller blades in the closed state.

10. The drone of claim 9, wherein movement of the second part from the open state to the closed state causes the plurality of propeller blades to move from the extended blade state to the collapsed blade state.

11. The drone of claim 10, wherein the third movable joint comprises a spring configured to maintain the plurality of propeller blades in the extended blade state, wherein the second part is in the open state.

12. The drone of claim 1, wherein the open state corresponding to the second part comprises a first open state, wherein in the first open state a longitudinal axis of the second part is substantially parallel to a plane of rotation corresponding to the plurality of propeller blades.

13. The drone of claim 1, wherein the open state corresponding to the second part comprises a second open state, wherein in the second open state a longitudinal axis of the second part is substantially perpendicular to a plane of rotation corresponding to the plurality of propeller blades.

14. The drone of claim 1, wherein at least one of the first part and the second part of each of the plurality of arms comprises a plurality of telescopic sections movably coupled together, wherein the plurality of telescopic sections is configured to be movable between a lengthened state and a shortened state.

15. The drone of claim 1 further comprising:
a first actuator operatively coupled to the body and the arm, wherein the first actuator is configured to move the arm between an extended arm state and a collapsed arm state;
a second actuator operatively coupled to the first part and the second part, wherein the second actuator is configured to move the second part between the open state and the closed state; and
a processor communicatively coupled to each of the first actuator and the second actuator, wherein the processor is configured to control operation of the first actuator and the second actuator.

16. The drone of claim 15 further comprising a wireless receiver communicatively coupled to the processor, wherein the wireless receiver is configured to receive a control command configured to control operation of at least one of the first actuator and the second actuator.

17. The drone of claim 1, wherein at least a portion of the arm comprises an anti-slip grip configured to facilitate gripping of the plurality of arms by the human hand.

18. The drone of claim 1, wherein the sensor comprises a camera.

19. The drone of claim 1 further comprising:
a rechargeable power source configured to provide electric power to the powered rotor, wherein the powered rotor comprises an electric motor;
a wireless transceiver configured to communicate with a remote device over a wireless communication channel; and
a controller communicatively coupled to the wireless transceiver and the powered rotor, wherein the controller is configured to control operation of the powered rotor.

20. The drone of claim 1, wherein the powered rotor comprises a fuel powered engine, wherein the body further comprises at least one fuel container configured to contain fuel.

* * * * *